June 4, 1957
E. E. NOYES
2,794,887
ANTI-BOUNCE STOPPING DEVICE
Filed June 14, 1954
2 Sheets-Sheet 2
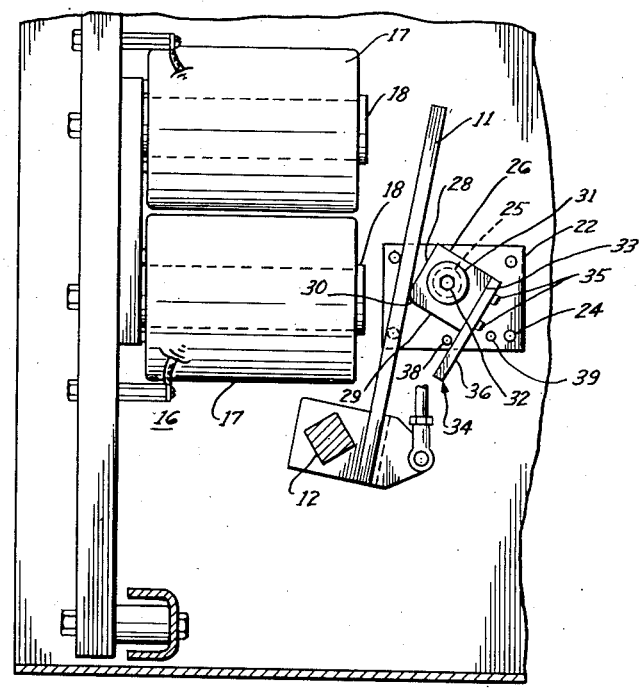
Fig. 3.
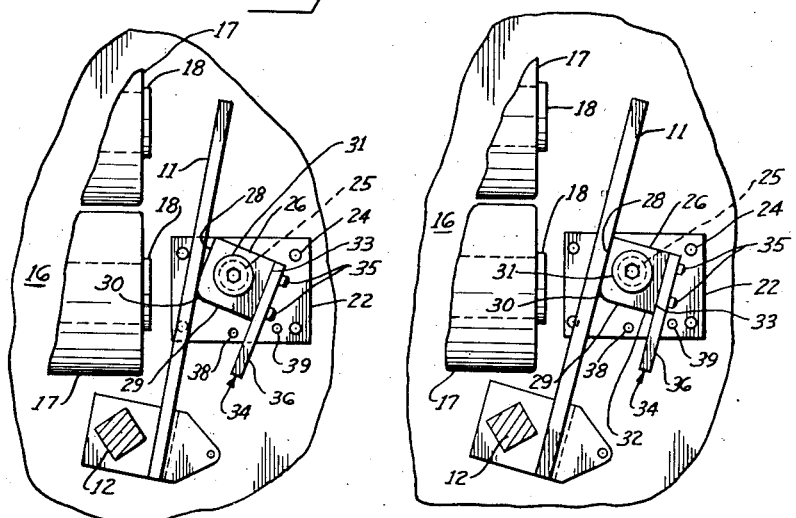
Fig. 4.
Fig. 5.
INVENTOR.
Everett E. Noyes,
BY John H. Leonard &
Harold J. Rathbun,
his ATTORNEYS.

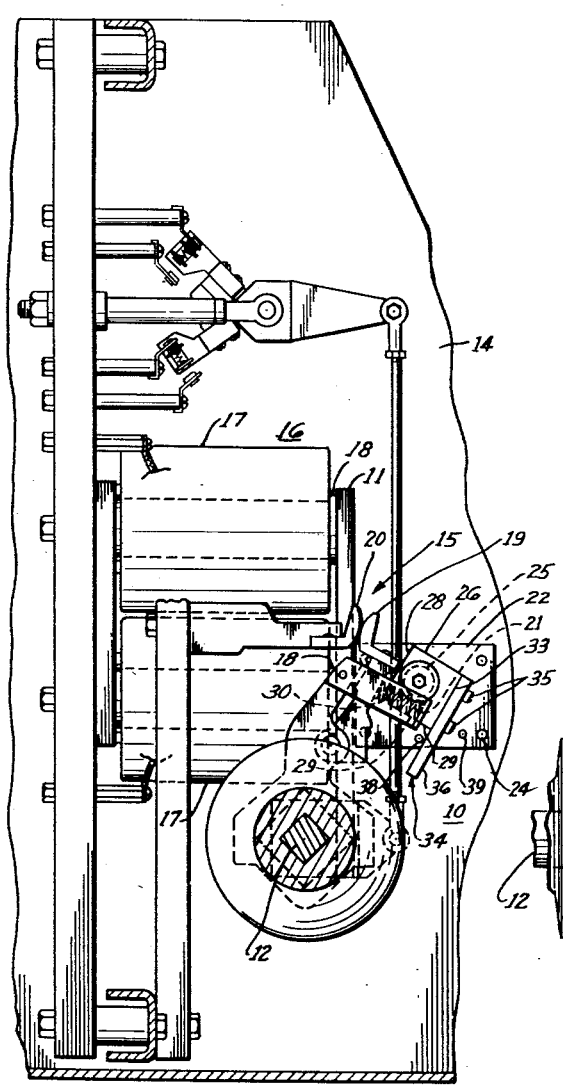

United States Patent Office 2,794,887
Patented June 4, 1957

2,794,887
ANTI-BOUNCE STOPPING DEVICE

Everett E. Noyes, Warrensville, Ohio, assignor, by mesne assignments, to Square D Company, Detroit, Mich., a corporation of Michigan Application June 14, 1954, Serial No. 436,372

4 Claims. (Cl. 200—166)

This invention relates to anti-bounce stopping devices for moving machine elements, and more particularly to an anti-bounce stopping device for absorbing the energy of the oscillatable portion of an electromagnetic contactor incident to the movement of that portion from a closed to an open circuit position.

In contactors of large current carrying and interrupting capacity, large and heavy metal parts must be used to carry the normal currents and to withstand the forces produced by fault currents. To insure proper interruption of the circuit, some of these heavy parts must travel at high speed from a closed circuit to an open circuit position. When such rapidly moving large masses engage a fixed stop at the open circuit position, they rebound causing the contacts to reapproach or reengage each other with resultant restriking of arcs between the contacts. Furthermore, the force of impact tends to destroy the engaging surfaces of the stop and of the moving masses and by transmission to other parts of the contactor causes other deleterious effects.

Various means have been used to overcome the foregoing disadvantages of fixed contactor stops. Many of the prior stopping devices depend solely on friction to absorb the energy and others use resilient means such as springs or rubber buffers. Prior devices depending soley on friction are unsatisfactory because they require that the moving parts travel a relatively long distance at progressively retarded speed before they are finally brought to rest. The use of springs and the like leads to rather complex structures some of which, although eliminating the deleterious effects of the initial impact force, augment rather than prevent rebound. In addition, many of the prior stopping devices are suitable for use only with one specific contactor operating mechanism and are not readily applicable to contactors of different designs.

It is an object of this invention to provide an improved stopping device for absorbing the energy of an oscillating machine element at the end of its travel.

Another object is to provide an improved stopping device for absorbing the energy of an oscillating machine element at the end of its travel and which does not retard the element until the desired stopping point is substantially reached.

Another object is to provide an improved stopping device that prevents the bounce or rebound of a moving mass after stopping it at its limit of travel.

Another object is to provide an anti-bounce stopping device which absorbs substantially all of the energy of a moving mass to be stopped and which is simple and rugged in construction, positive and reliable in operation, and capable of being readily applied to existing contactors of various types to absorb the energy of the oscillatable contactor parts at the end of their travel.

Another object is to provide an improved anti-bounce stopping device and moving machine element combination by which the kinetic energy of the element is converted into heat by friction and into potential energy by repositioning of a weight.

Another object is to provide a stopping device for an oscillating machine element which imposes a frictional force on the member that is directly related to the speed of the member at the moment of impact.

Another object is to provide an anti-bounce stopping device comprising a movable stopping element which is moved by a machine element to be stopped from an initial position to a final engaged position with a mechanical advantage that increases during the movement.

Another object is to provide a stopping device comprising a movable stopping element yieldably urged to an initial position by a self-restoring means with a mechanical advantage that increases as the stopping element is moved from the initial position to a final engaged position.

Another object is to provide a stopping device comprising a movable stopping element which not only is moved by a machine element to be stopped from an initial position to a final engaged position with a mechanical advantage that increases during the movement but also which is yieldably restrained against said movement by a self-restoring means with a mechanical advantage that increases during the movement, whereby, by variations in the relations of the parts, the mechanical advantages can be correlated for providing a wide range of effects so that the device is readily adaptable to various types and sizes of moving elements.

The anti-bounce stopping device of the present invention may be applied to a contactor having a frame member and an armature member which is supported for movement relative to the frame member from a closed to an open position. The stopping device comprises a stopping element mounted on one of the members, preferably the frame member, for movement relative thereto and a self-restoring means yieldably urging the stopping element into a predetermined initial position. When mounted on the frame member, the stopping element is engageable when it is in its initial position by the armature member and is movable thereby from its initial position against the force of the self-restoring means. Force multiplying means is operatively interposed between and connects the armature member and the stopping element and is operative to develop initially a high degree of frictional resistance to the movement of the armature member. The restorative force of the self-restoring means is applied to the armature member with a mechanical advantage which increases as the armature member moves toward its open position while engaged with the stopping element. A similar operation occurs if the stopping element is mounted on the armature member for engagement with the frame member.

Briefly, in a preferred embodiment of this invention, the anti-bounce stopping device comprises a stopping element in the form of a rotatable sleeve located in the path of movement of a contactor armature or other oscillatable machine element. The sleeve carries a self-restoring means in the form of a counterweight or pendulum which normally maintains by gravity a curved face portion of the sleeve in a position to be engaged by the armature as its limit of movement is nearly reached. When struck by the armature, a frictional resistance occurs between the armature and the sleeve, the sleeve starts to turn, and the frictional resistance continues as the armature moves toward its final stopping position. Turning of the sleeve raises a counterweight. As the sleeve turns, the mechanical advantage between the counterweight and the sleeve increases. A large proportion of the kinetic energy of the moving element is thus converted into heat by friction and substantially all of the remainder is efficiently converted into potential energy in the counterweight.

Further objects and advantages of this invention will become apparent from the following description wherein reference is made to the drawings, in which:

Figure 1 is a front elevation of the stopping device applied to a clapper type contactor, only a portion of the contactor being illustrated and its armature being shown in its closed position;

Figure 2 is a side elevation of the contactor of Figure 1;

Figure 3 is a sectional view taken along the line 3—3 of Figure 1, but showing the stopping device at the instant it is engaged by the armature as the armature is moving to its open position; and Figures 4 and 5 are views similar to Figure 3 but showing the armature during stopping and in its stopped position, respectively.

Referring to Figures 1 and 2, an anti-bounce stopping device 10 illustrative of the present invention is shown as applied to an electromagnetic contactor having an armature 11 fixedly secured to a rockable shaft 12 supported at one end portion by a bearing 13 carried by a side plate 14. Another bearing (not shown) carried by a similar side plate 14 is arranged to rotatably receive the other end portion of the shaft 12. Fixedly secured in spaced relation to the shaft 12, at the left of the armature 11 as viewed in Figure 1, is a plurality of identical movable contact assemblies 15 only one of which is illustrated. The armature 11 is arranged to be attracted by a magnet structure 16 having a pair of vertically spaced coils 17.

When the coils 17 are energized, the armature 11 and the shaft 12 are in the turned position illustrated in Figures 1 and 2 wherein the armature 11 is in engagement with core cans 18 of the magnet structure 16 and movable contacts 19 of the contact assemblies 15 are engaged with respective complementary stationary contacts 20. When the contacts 19 and 20 are engaged, contact pressure springs 21 respective to the movable contacts 19 are compressed to insure a definite engaging force between the contacts.

Upon deenergization of the coils 17, the armature 11 rotates clockwise (Figure 2) away from the core caps 18 initially because of the combined attraction of gravity and the force of auxiliary contact pressure springs 21, and after separation of the contacts 19 and 20, because of gravity alone as is well known in the art. In contactors of large current capacity and high interrupting capacity, the movable contact assemblies 15 and the armature 11 are heavy. The large current capacity requires large contact pressure and the high interrupting capacity requires that the contacts separate rapidly. The contact pressure springs 21 provide the large contact pressure and also cause rapid acceleration of the moving parts toward their open position.

The anti-bounce stopping device 10 serves to stop the moving parts at the end of their travel in the opening direction and preferably comprises a mounting plate 22 suitably fastened as by bolts 24 to the inner wall of the side plate 14 adjacent the armature 11. A cylindrical stud 25 is suitably secured at one end to the plate 22 and projects therefrom into the path of movement of the armature 11. If desired, the stud 25 can be welded or otherwise secured directly to the side plate 14 and the mounting plate 22 can be omitted. The stud 25 rotatably receives a sleeve 26 having a generally square transverse cross section except that the intersection of its side faces 28 and 29 is rounded off to define a curved surface 30. The sleeve 26 is substantially coextensive in length with the stud 25 and is held against longitudinal movement from the stud 25 by a washer 31 on a cap screw 32 threaded axially into the outer end of the stud 25.

The sleeve 26 may be formed from any suitable material having high impact strength. Preferably the material of the sleeve 26 has a relatively high coefficient of friction. Canvas-base Bakelite has been found to be very satisfactory.

On a side face 33 of the sleeve 26 opposite the side face 28 is secured a counterweight or pendulum 34 preferably by a pair of cap screws 35. The counterweight 34 is an elongated flat bar of uniform cross-section preferably formed of iron and has one end portion 36 extending downward beyond the line of intersection of the side faces 29 and 33 so that its center of gravity is in the region of that line of intersection. Preferably, the counterweight 34 is disposed at the end portion of the side face 33 nearest the plate 22 so that it can depend between and selectively engage one or the other of a pair of stop pins 38 and 39 projecting from the plate 22. The pins 38 and 39 thereby serve to limit the extent of rotation of the sleeve 26 on the stud 25. The sleeve 26 should turn sufficiently freely on the stud 25 so that, when the armature 11 moves to its attracted position, gravity causes the counterweight 34 to turn the sleeve 26 until the counterweight engages the pin 38. When the counterweight 34 is in engagement with the pin 38, the curved surface 30 is directed toward the armature 11.

In operation, assume that the armature 11 is in its attracted position against the core caps 18 as shown in Figure 2, and that the sleeve 26 and the counterweight 34 have assumed the turned position of Figure 2 with the counterweight 34 in engagement with the stop 38. Upon deenergization of the coils 17, the armature 11 is released and rocks clockwise (Figures 2 through 5) turning the shaft 12 in its bearings 13 and, after the movable contacts 19 have separated an adequate distance from the stationary contacts 20, strikes the curved surface 30 as shown in Figure 3. The line of contact between the armature 11 and curved surface 30 at this instant is at such a distance from the axis of the sleeve 26 that, considering the momentum of the moving parts, adequate torque is exerted on the sleeve 26 to turn it on the stud 25. Since the curved surface 30 is below the pin 25, the stored energy in the moving parts of the contactor causes the sleeve 26 to rotate counterclockwise on the stud 25, as viewed in the drawings, moving the counterweight 34 away from the pin 38 as shown in Figure 4.

During rotation of the sleeve 26, the surface 30 slides along the armature 11 causing some of the energy of the moving parts to be dissipated as friction. The frictional force between the armature 11 and the surface 30 varies with the speed of movement of the armature 11 so that the retarding force required and the retarding force provided are directly related. The kinetic energy of the moving parts of the contactor is thus translated by means of the surface 30 of the sleeve 26 into friction and into potential energy stored in the counterweight 34. The armature moves through the position of Figure 4 and eventually comes to rest against the side face 28 of the sleeve 26 with the counterweight 34 in the raised position, as illustrated in Figure 5. The pin 39 serves to insure that the counterweight 34 does not turn too far under unusual conditions.

It is to be noted that as the counterweight 34 moves from its position against the stop 38 as shown in Figure 3 through the position of Figure 4 to the position of Figure 5, the mechanical advantage of the restorative force of the counterweight increases and the mechanical advantage of the armature 11 increases.

Because some of the energy of the moving parts is dissipated as friction and substantially all of the remainder is absorbed in the counterweight, forces transmitted to the frame of the contactor are very small and there is no tendency for the armature 11 to rebound. It is to be noted that the armature 11 has nearly reached its final open position before the stopping operation starts. This insures rapid separation of the contacts 19 and 20.

The stopping device 10 is readily adapted for use with many contactors having an oscillating or reciprocating armature and can be used with contactors having normally closed contacts as well as with normally open contacts as shown.

Having thus described my invention, I claim:

1. In a mechanism of the type having a fixed frame member, a movable member carried by the frame member and movable relative thereto from a first position to a second position, means causing the movable member to move from its first position to its second position, an anti-bounce element pivotally mounted on one of the members and having a peripheral friction surface, self-restoring means yieldably urging the element into a predetermined rotated position about its pivot, said surface being engageable, while said element is in said predetermined position, by the other of said members as said movable member is moving from its first toward its second position so as initially to apply force to said surface along an instantaneous line of force eccentric to the pivotal axis of the element, and said other member being slideable along said surface for progressively decreasing the eccentricity of the line of force to the axis whereby said element is rotated about its pivot against the resistance of the self-restoring means with a mechanical advantage of the member which decreases, thereby increasing the mechanical advantage of the self-restoring means, as said movable member moves toward its second position while the other of said members is engaged with the element.

2. The mechanism of claim 1 characterized in that said self-restoring means is a weight rotatable with said element and positioned so that it is raised from one position below the axis continuously toward another position below the axis during said movement of said member from its first to its second position.

3. The mechanism of claim 1 characterized in that the resistance to rotation of said element is so balanced with the force applied to its by said movable member that said other of said members and said anti-bounce element remain in engagement until said second position of the movable member is reached.

4. In a clapper type contactor having a supporting means carrying a first pivot, a movable contact assembly mounted for rocking motion about the axis of said first pivot, means for causing said contact assembly to rock about said axis from a first position to a second position, a second pivot carried by said frame, an anti-bounce element mounted for rotation about the axis of said second pivot, a peripheral friction surface on said element in a normal position in the path of movement of a portion of said contact assembly as it nears the second position and engageable thereby for applying force thereto along a line eccentric to the second pivot as said contact assembly portion moves towards its second position, a self-restoring means operative to hold said friction surface in said normal position, the relative position of said pivots being such that, upon engagement of said contact assembly portion with said friction surface, said element turns on said second pivot against the force of the self-restoring means, and said portion being in sliding frictional engagement with said surface.

References Cited in the file of this patent
UNITED STATES PATENTS

| 2,137,000 | Deans | Nov. 15, 1938 |
| 2,303,443 | Duffing et al. | Dec. 1, 1942 |